(12) United States Patent
Abraham et al.

(10) Patent No.: US 9,792,827 B2
(45) Date of Patent: Oct. 17, 2017

(54) PROVIDING QUESTIONS TO ENTITY GROUPS

(75) Inventors: Ittai Abraham, San Francisco, CA (US); Omar Alonso, Redwood Shores, CA (US); Vasilis Kandylas, Sunnyvale, CA (US); Aleksandrs Slivkins, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 461 days.

(21) Appl. No.: 13/437,015

(22) Filed: Apr. 2, 2012

(65) Prior Publication Data

US 2013/0260352 A1    Oct. 3, 2013

(51) Int. Cl.
*G09B 7/02* (2006.01)

(52) U.S. Cl.
CPC ........................ *G09B 7/02* (2013.01)

(58) Field of Classification Search
CPC ....................................................... G09B 7/02
USPC ............................................................ 434/350
See application file for complete search history.

(56) References Cited

U.S. PATENT DOCUMENTS

| | | | |
|---|---|---|---|
| 8,291,069 B1 * | 10/2012 | Phillips ................... | G06F 17/18 375/341 |
| 2002/0076674 A1 * | 6/2002 | Kaplan ........................ | 434/107 |
| 2002/0156596 A1 * | 10/2002 | Caruso et al. ................ | 702/179 |
| 2010/0293026 A1 | 11/2010 | Vojnovic et al. | |
| 2011/0145156 A1 * | 6/2011 | Feng et al. .................... | 705/301 |
| 2011/0191052 A1 | 8/2011 | Lin et al. | |

OTHER PUBLICATIONS

Frerichs RR: Cluster sampling, Chapter Five, in Rapid Surveys, 2004.*
Business Dictionary: Convenience Sampling, <https://web.archive.org/web/20111029185802/http://www.businessdictionary.com/definition/convenience-sampling.html>.*
Wikipedia: Confidence Intervals, Section Confidence intervals for proportions and related quantities <https://web.archive.org/web/20110331200038/http://en.wikipedia.org/wiki/Confidence_interval#Confidence_intervals_for_proportions_and_related_quantities>.*
Zhang, et al., "Crowdsourcing General Computation", Retrieved at <<http://crowdresearch.org/chi2011-workshop/papers/zhang.pdf>>, CHI, May 7-12, 2011, pp. 5.

(Continued)

*Primary Examiner* — Thomas Hong
(74) *Attorney, Agent, or Firm* — Jonathan M. Waldman

(57) ABSTRACT

Entities that answer questions are organized into entity groups. An interface determines an answer to a question from one of the entity groups with a confidence that is greater than a second confidence threshold. To determine the answer, the interface performs an exploration phase where the interface asks the question to each of the entity groups. Entity groups that provide answers with a confidence that is greater than a first confidence threshold are selected for a subset. The interface enters an exploitation phase where the question is asked of the entity groups in the subset. If an answer is determined with a confidence that is greater than the second confidence threshold, then the answer is provided. If no answer is determined before a duration of time expires, then the interface enters a rollback phase where all of the entity groups are considered.

20 Claims, 6 Drawing Sheets

(56) References Cited

OTHER PUBLICATIONS

Karger, et al., "Budget-optimal Crowdsourcing using Low-rank Matrix Approximations", Retrieved at <<http://web.mit.edu/swoh/www/paper_crowdsourcing_allerton.pdf>>, CCC, Sep. 28-30, 2011, pp. 8.

Karger, et al., "Budget-Optimal Task Allocation for Reliable Crowdsourcing Systems", Retrieved at <<http://arxiv.org/pdf/1110.3564v2>>, Nov. 9, 2011, pp. 27.

Psaier, et al., "Resource and Agreement Management in Dynamic Crowdcomputing Environments", Retrieved at <<http://www.danielschall.at/2011_edoc_pssd.pdf>>, EDOC, Sep. 29, 2011, pp. 193-202.

Khazankin, et al., "QoS-based Task Scheduling in Crowdsourcing Environments", Retrieved at <<http://www.infosys.tuwien.ac.at/staff/khazankin/pdf/scheduled_cs.pdf>>, ICSOC, Dec. 5-8, 2011, pp. 297-311.

Jamjoom, et al., "Crowdsourcing and Service Delivery", Retrieved at <<http://ieeexplore.ieee.org/stamp/stamp.jsp?tp=&arnumber=5429040>>, IBMRD, Nov. 2009, pp. 12:1-12:10.

Kamar, et al., "CrowdSynth: A System for Combining Human and Machine Intelligence in Crowdsourcing", Retrieved at <<http://scholar.googleusercontent.com/scholar?q=cache:QLV_1riDtP4J:scholar.google.com/+&hl=en&as_sdt=1,5>>, Sep. 2011, pp. 40.

\* cited by examiner

PROVIDING QUESTIONS TO ENTITY GROUPS

BACKGROUND

Crowdsourcing is the technique in which a computational process performs its function by outsourcing certain steps to one or more entities. These entities may include humans, computers, or combinations thereof. For example, a computational process may use crowdsourcing by asking entities to provide an answer to a question. The answer to the question may then be used by the computational process in performing a task. Platforms that use crowdsourcing have become a crucial infrastructure for distributing, collecting, and aggregating human judgment for a wide range of tasks and applications.

Current systems that utilize crowdsourcing typically have limitations that fix in advance the amount of resources (i.e., entities) that may be used for each task. If too many entities are queried, then the cost becomes too high and if too few are queried then the result may not be accurate enough. Obtaining a tradeoff between cost and accuracy may be difficult, especially if the set of tasks are heterogeneous.

SUMMARY

Entities that answer questions, such as human experts, are organized into entity groups. An interface determines an answer to a question from one of the entity groups with a confidence that is greater than a second confidence threshold. To determine the answer, the interface performs an exploration phase where the interface asks the question to each of the entity groups. Entity groups that provide answers with a confidence that is greater than a first confidence threshold are selected for a subset. The interface enters an exploitation phase where the question is asked of the entity groups in the subset. If an answer is determined with a confidence that is greater than the second confidence threshold, then the answer is provided. If no answer is determined before a duration of time expires, then the interface enters a rollback phase where all of the entity groups are considered. The confidence of an answer is calculated from the answer and one or more previously received answers.

In an implementation, a question is received at a computing device. Identifiers of entity groups are received at the computing device. Each entity group comprises one or more entities. A subset of the entity groups whose entities provide an answer to the received question with a confidence that is greater than a first confidence threshold is determined. The determination is made based on the answer and one or more previously received answers from some or all of the entity groups. An entity group from the subset of entity groups whose entities provide an answer to the received question with a confidence that is greater than a second confidence threshold is determined. The second confidence threshold is greater than the first confidence threshold. An answer from the determined entity group from the subset of entity groups with the confidence that is greater than the second confidence threshold is provided by the computing device.

In an implementation, an index value for each entity group from a subset of entity groups is generated by a computing device. The index value for an entity group is based on a cost associated with the entity group, and each entity group includes a plurality of entities. A first entity group from the subset of entity groups with a lowest index value is selected by the computing device. An entity from the first entity group is selected by the computing device. The selected entity is provided a question by the computing device. An answer is received from the selected entity by the computing device. A confidence for the received answer is determined by the computing device. The confidence is determined based on the received answer and one or more previously received answers from the first entity group or the subset of entity groups. Whether the determined confidence is greater than a confidence threshold is determined by the computing device. If it is, the received answer is provided as an answer to the question by the computing device.

In an implementation, a question is received. A first entity group is selected from the plurality of entity groups. The first entity group is provided the question. An answer is received from an entity from the first entity group. A confidence for the received answer is determined. The confidence may be determined based on the received answer and one or more previously received answers from the first entity group or a subset of the plurality of entity groups. Whether the determined confidence is greater than a confidence threshold is determined. If it is, the received answer is provided as an answer to the question.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
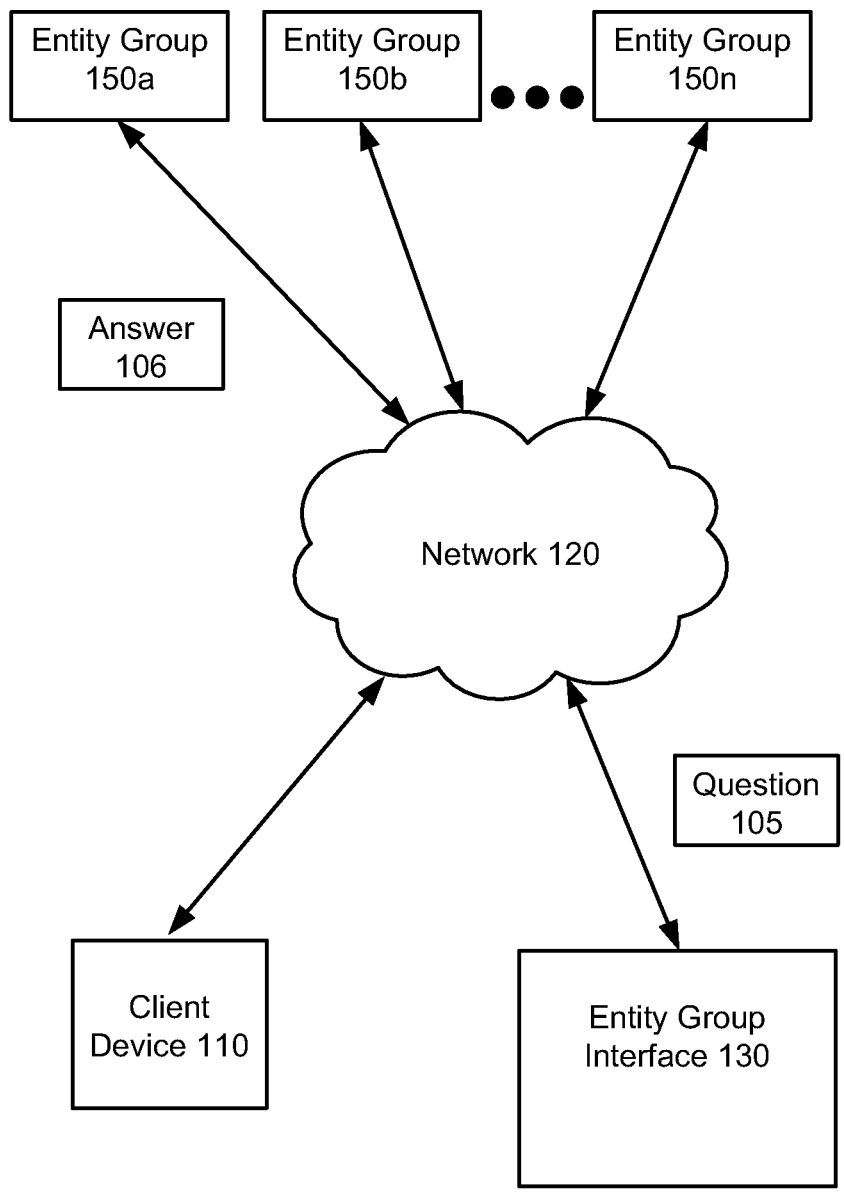
FIG. 1 is an illustration of an example environment for providing questions to one or more entity groups.

FIG. 1 is an illustration of an example environment 100 for providing questions to one or more entity groups. In the environment 100, a client device 110 may communicate through a network 120 (e.g., Internet, WAN, LAN, 3G, or other communication network) with a plurality of entity groups 150*a*, 150*b*, ..., 150*n*, where n may be any number.

In some implementations, the client device 110 may include a desktop personal computer, workstation, laptop, smart phone, cell phone, or any WAP-enabled device or any other computing device capable of interfacing directly or indirectly with the network 120. The client device 110 may run an HTTP client, e.g., a browsing program, such as MICROSOFT INTERNET EXPLORER or other browser, or a WAP-enabled browser in the case of a cell phone, smart phone, or other wireless device, or the like, allowing a user of the client device 110 to access, process and view information made available to it from the entity groups 150a-n.

Each entity group 150a-n may comprise a collection of related entities. Depending on the implementation, the entities in each entity group 150a-n may include a variety of data sources including human experts, databases, computers or computer programs, search engines, libraries, artificial intelligences, etc.

The entities in the entity groups 150a-n may receive a question 105 from a client device 110 and may, in response, generate an answer 106. The question 105 may include a variety of question types including, but not limited to, multiple choice questions, mathematical questions, trivia questions, and true or false questions, for example.

Asking an entity from the entity groups 150a-n a question 105 may be associated with a cost. Each entity group 150a-n may include entities that have the same cost. The cost of asking a question 105 may be based on a variety of factors including bandwidth costs, networking characteristics, processing costs, etc.

As may be appreciated, when a client device 110 has a question 105, the client device 110 may not know which of the entity groups 150a-n to ask the question 105. The client device 110 may further not know how many times to ask the question 105 before the client device 110 is satisfied that it has received a correct answer 106.

Accordingly, the environment 100 may further include an entity group interface 130. The entity group interface 130 may receive a question 105 from a client device 110 and may determine which of entity groups 150a-n to ask the received question 105. The entity group interface 130 may further ask the entity groups 150a-n the received question 105 until an answer 106 having a predetermined confidence level is received. The confidence of the answer 106 may be determined based on the received answer 106 and a plurality of previously received answers from some or all of the entity groups 150a-n. The entity group interface 130 may be implemented using a general purpose computing device such as the computing system 600 described with respect to FIG. 6.

In some implementations, the entity group interface 130 may receive a question 105 from a client device 110, and may select an entity group 150a-n to ask the received question 105. The entity group 150a-n may be randomly selected, selected based on the associated cost, or as described further with respect to FIG. 2, selected based on a determined index value associated with each entity group 150a-n, for example.

The entity group interface 130 may provide the question 105 to an available entity from the selected entity group 150a-n, and may receive an answer 106 in response to the question 105. The entity group interface 130 may continue to ask the question 105 to an available entity from the selected entity group 150a-n until an answer 106 is received having a confidence that is greater than a confidence threshold. The confidence of an answer 106 may be determined using the received answer 106 and one or more previously received answers 106 from the selected entity group 150a-n, or some subset of the entity groups 150a-n, for example.

After an answer 106 with a confidence that is greater than the confidence threshold is received, the entity group interface 130 may provide the received answer to the client device 110. The confidence of the answer 106 may be determined using any one of a variety of statistical methods. The confidence threshold may be set by a user or administrator, for example.

As described above, in some implementations, the entity group interface 130 may continue to ask the question 105 until an answer 106 with a confidence that is greater than the confidence threshold is received. Alternatively, the entity group interface 130 may also stop asking the question 105 after a condition has been met. The condition may be the expiration of a time period, a predetermined number of asks, or the exhaustion of a budget, for example. For example, the entity group interface 130 may subtract a cost associated with the selected entity group 150a-n from a budget associated with the client device 110 each time the question 105 is asked. The condition may be set by a user or administrator, for example.

If the condition is met before the entity group interface 130 determines an answer 106 with the confidence threshold, the entity group interface 130 may provide the answer 106 with the greatest determined confidence so far to the client device 110 that provided the question 105. Alternatively or additionally, the entity group interface 130 may generate and provide an error message to the client device 110.

Figure 2:
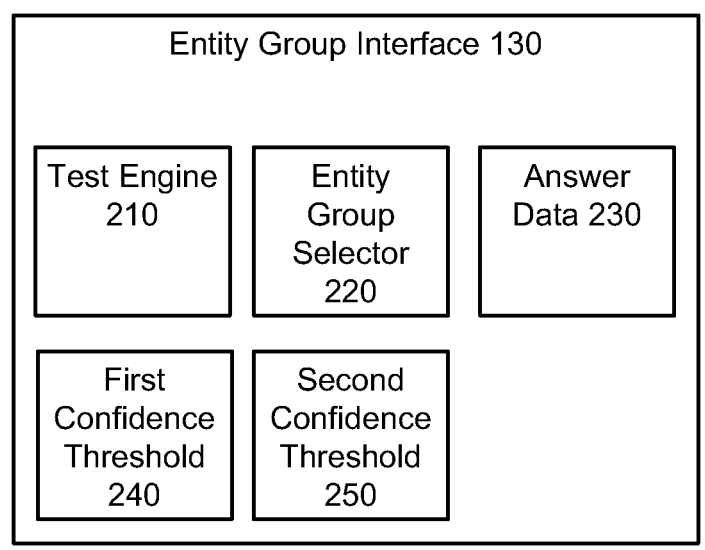
FIG. 2 is an illustration of an example entity group interface.

FIG. 2 is an illustration of an example entity group interface 130. As illustrated, the entity group interface 130 comprises several components including, but not limited to, a test engine 210, an entity group selector 220, answer data 230, a first confidence threshold 240, and a second confidence threshold 250. More or fewer components may be supported.

The test engine 210 may determine if an answer 106 received from an entity of an entity group 150a-n meets a confidence threshold (e.g., one of the first confidence threshold 240 or the second confidence threshold 250). In some implementations, the test engine 210 may be a function that takes as an input a currently received answer 106, a confidence threshold, and a set of answers received so far (if any) from entities in the entity group 150a-n. The test engine 210 may determine if a determined confidence of currently received answer 106 meets or exceeds the confidence threshold based on some or all of the set of answers received so far. If the confidence exceeds the confidence threshold, the test engine 210 may return the determined confidence. Otherwise, the test engine 210 may return null or some other value that indicates that the confidence threshold value has not been met.

The set of answers received so far may be retrieved by the test engine 210 from the answer data 230. The entity group interface 130 may store answers received from the entities of the entity groups 150a-n in the answer data 230. The stored answers may be associated with the entity group that includes the entity that generated each answer 106, or may be associated with all or some subset of the entity groups 150a-n.

In some implementations, the test engine 210 may calculate the confidence of a received answer as follows. For each answer x, let $N(x)$ be a number of times that the answer x was provided by an entity from the entity group in response to the question 105. Let N be the total number of answers 106 provided to the question 105, and $N(y)$ be the number of times that a different answer y was provided. Let $f(\epsilon, N)$ be a confidence function where $\epsilon$ is the confidence threshold. If $N(x)-N(y)>f(\epsilon, N)$, then the answer x exceeds the confidence threshold. Otherwise, the answer x does not exceed the confidence threshold.

In some implementations, the confidence function $f(\epsilon, N)$ may be calculated by the test engine 210 as the formula (1), where C is a user or administrator selected constant such as ten, for example:

$$f(\epsilon, N) = C\sqrt{N\log\frac{1}{\epsilon}} \quad (1)$$

The entity group selector 220 may select which entity group 150a-n to provide the received question 105. In some implementations, the entity group selector 220 may select the entity group with the lowest associated cost, or may randomly select the entity group. Other methods for selection may be used, such as round robin, for example.

In some implementations, the entity group selector 220 may determine an index value for each of the entity groups 150a-n, and may select an entity group based on the index values. For example, the entity group selector 220 may select the entity group with the lowest or minimum index value.

The entity group selector 220 may determine the index value for an entity group based on the cost associated with the entity group and a bias associated with the entity group. The bias for an entity group may be based on the answers generated by entities in the entity group so far to a question 105, and may be a measure of how much the generated answers agree (or disagree) with each other. The index values for the entity groups 150a-n may be generated by the entity group selector 220 to favor the selection of entity groups that are low cost and highly biased.

In some implementations, the index value for an entity group may be proportional to the cost associated with the entity group, and inversely proportional to the bias, or the square of the bias, associated with the entity group. For example, the index value of an entity group i may be calculated by the entity group selector 220 using the following formula (2) where c(i) is the cost associated with the entity group i and bias(i) is the calculated bias associated with the entity group i:

$$\text{index}(i) = \frac{c(i)}{(\text{bias}(i))^2} \quad (2)$$

Initially, when no answers have been provided by an entity group, the bias may be estimated or guessed by the entity group selector 220. Any method or technique for estimating a bias may be used.

After some answers have been received, the entity group selector 220 may calculate the bias as a gap between the two most frequently received answers from an entity group. The gap may be calculated by entity group selector 220 using the following formula (3) where j(i) is the most frequently provided answer 106, k(i) is the second most frequently provided answer 106, and T(i) is the total number of answers provided so far:

$$\text{gap}(i) = dx(i)/T(i), \text{ where } dx(i) = x(j(i)) - x(k(i)) \quad (3)$$

In some implementations, the bias calculation by the entity group selector 220 may further include the calculation of a confidence radius. The confidence radius may be calculated by the following formula (4) where C is a constant selected by a user or administrator:

$$\text{rad}(C, i) = C/\sqrt{T(i)} \quad (4)$$

Combining the formulas (2)-(4) results in the following formula (5) that may be used by the entity group selector 220 to calculate the index value for each entity group:

$$\text{index}(i) = \frac{c(i)}{(\text{gap}(i) + \text{rad}(C, i))^2} \quad (5)$$

Alternatively, or additionally, the index value for an entity group i may be calculated by the entity group selector 220 using the following formula (6) where $N_{i,A}$ is the number of times that an entity from the entity group i has given the answer 106 A, $N_{i,B}$ is the number of times that an entity from the entity group i has given the answer 106 B, and $N_i$ is the total number of answers given by entities from the entity group i:

$$\text{index}(i) = \frac{c(i)}{\left(\frac{|N_{i,A} - N_{i,B}|}{N_i} + \frac{1}{\sqrt{N_i}}\right)^2} \quad (6)$$

In some implementations, the entity group interface 130 may determine an answer 106 to a question 105 from the entity groups 150a-n in three phases. The three phases are referred to herein as an exploration phase, an exploitation phase, and a rollback phase.

When a question 105 is received by the entity group interface 130, the entity group interface 130 may begin the exploration phase. During the exploration phase, the entity group interface 130 may prune or reduce the number of entity groups that are considered to form a subset of the entity groups 150a-n. During the exploitation phase, the entity group interface 130 may then consider the entity groups in the subset.

During the exploration phase, the entity group selector 220 of the entity group interface 130 may select an entity group. The entity group interface 130 may ask an available entity from the selected entity group the question 105. The entity group interface 130 may update the answer data 230 using the received answer 106 and may use the test engine 210 to determine if the received answer 106 has a confidence that is greater than the first confidence threshold 240. The confidence may be determined based on the received answer 106 and previously received answers 106 from the answer data 230. The test engine 210 may consider previously received answers 106 from entities from some or all of the entity groups 150a-n. If the confidence is not greater than the first confidence threshold 240, then the entity group selector 220 of the entity group interface 130 may select a different entity group to ask the question 105. If the confidence is greater than the first confidence threshold 240, then the entity group interface 130 may add the selected entity group to the subset of entity groups.

During the exploration phase, the entity group selector 220 may continue to ask the question 105 of entities of entity groups 150a-n selected by the entity group selector 220 and may determine if received answers are greater than the first confidence threshold 240 until a condition is met. The condition may be the expiration of an amount or duration of time allotted to the exploration phase, or the exhaustion of a budget allotted to the exploration phase, for example.

After the exploration phase has completed, the entity group interface 130 may enter the exploitation phase. During the exploitation phase, the entity group selector 220 of the entity group interface 130 may ask entities from entity groups in the subset of entity groups 150*a-n* selected during the exploration phase the question 105. However, rather than comparing determined confidences of received answers 106 to the first confidence threshold 240, the entity group interface 130 may compare the determined confidence with the second confidence threshold 250. The second confidence threshold 250 is greater than the first confidence threshold 240. Thus, the lower first confidence threshold 240 of the exploration phase is used by the entity group interface 130 to quickly weed out those entity groups that are unlikely to be able to meet the stricter second confidence threshold 250.

During the exploitation phase, the entity group selector 220 of the entity group interface 130 may select an entity group from the subset of entity groups 150*a-n*. In some implementations, the entity group selector 220 may randomly select the entity group from the subset, or may select the entity group with the lowest associated cost. In other implementations, the entity group selector 220 may select the entity group with the lowest index value.

The entity group selector 220 may ask an entity from the selected entity group the question 105. The entity group selector 220 may then update the answer data 230 using a received answer 106 and may use the test engine 210 to determine a confidence of the received answer 106. The test engine 210 may determine the confidence using the answer 106 and one or more previously received answers 106 from the answer data 230 as described above. If the confidence is greater than the second confidence threshold 250, then the entity group interface 130 may exit the exploitation phase and provide the received answer 106 to the client device 110. If the confidence is less than the second confidence threshold 250, the entity group selector 220 may select a new entity group from the subset of entity groups to ask the question 105. In addition, the entity group interface 130 may update the index value of the selected entity group before selecting a new entity group.

In some implementations, the exploitation phase may continue until the test engine 210 determines an answer 106 with a determined confidence that is greater than the second confidence threshold 250. Alternatively, the exploitation phase may end if a condition is met and no answer 106 is determined having a confidence that is greater than the second confidence threshold 250. The condition may be the expiration of a time period, a selection of a number of entity groups, or the exhaustion of a budget, for example.

If the exploitation phase ends without determining an answer 106 with a confidence that is greater than the second confidence threshold 250, the entity group interface 130 may enter the rollback phase. During the rollback phase, the entity group interface 130 may continue to compare determined confidences of answers to the second confidence threshold 250 based in part on previously received answers 106 from some or all of the entity groups 150*a-n*. However, instead of limiting the selection of entity groups to the subset determined in the exploration phase, the entity group interface 130 may select entity groups from all of the entity groups 150*a-n*. As may be appreciated, because the exploitation phase failed, the selected subset of entity groups may have been too restrictive and may have prematurely eliminated one or more entity groups from consideration. Accordingly, the entity group interface 130 may consider all of the entity groups 150*a-n* in the rollback phase.

During the rollback phase, the entity group selector 220 of the entity group interface 130 may select an entity group from the entity groups 150*a-n*. The entity group selector 220 may select the entity group based on the index values associated with each entity group, or may select the entity group randomly. The entity group interface 130 may ask an entity from the selected entity group the question 105. The entity group selector 220 may then update the answer data 230 using a received answer 106 and may use the test engine 210 to determine a confidence of the received answer 106.

If the confidence is greater than the second confidence threshold 250, then the entity group interface 130 may exit the rollback phase and provide the received answer 106 to the client device 110. If the confidence is less than the second confidence threshold 250, the entity group selector 220 may select a new entity group from the entity groups 150*a-n* to ask the question 105. In addition, the entity group selector 220 may update the index value associated with the selected entity group before selecting a new entity group.

In some implementations, the rollback phase may continue until the test engine 210 determines an answer 106 with a determined confidence that is greater than the second confidence threshold 250 based on the answer 106 and previously received answers 106. Alternatively, the rollback phase may end if a condition is met and no answer is determined having a confidence that is greater than the second confidence threshold 250. The condition may be the expiration of a time period, a selection of a predetermined number of entity groups, or the exhaustion of a budget, for example.

In some implementations, rather than determine an answer 106 to a received question 105 using the exploration, exploitation, and rollback phases described above, the entity group interface 130 may determine an answer 106 using what is referred to herein as an index based algorithm. In the index based algorithm, the entity group selector 220 may determine an index value for all, or some subset of, the entity groups 150*a-n* as described above. The entity group selector 220 may then select an entity group with the lowest index value, and the entity group interface 130 may provide an entity from the selected entity group the question 105.

The test engine 210 may then determine a confidence of the received answer 106 based on the answer 106 and previously received answers 106. If the confidence is greater than the second confidence threshold 250, then the entity group interface 130 may provide the received answer 106 and may exit the index based algorithm. Else, the entity group selector 220 may re-determine the index values based on the received answers 106, and may select the entity group with the lowest index value. The index based algorithm may continue until either an answer 106 with a confidence that is greater than the second confidence threshold 250 is determined, or a condition is met. The condition may be the expiration of a time period or the exhaustion of a budget, for example.

Figure 3:
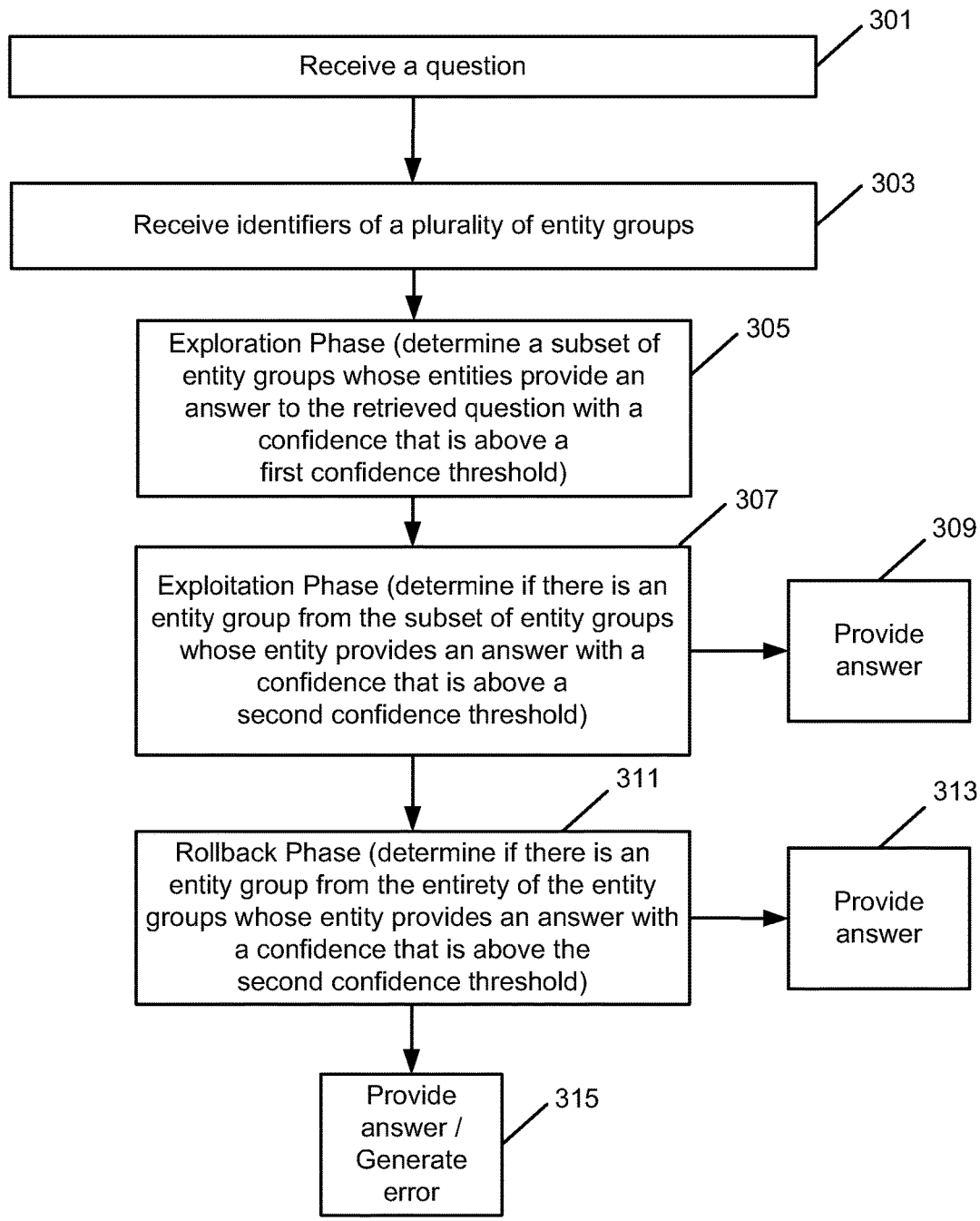
FIG. 3 is an illustration of a method for providing an answer to a question from an entity from one of a plurality of entity groups.

FIG. 3 is an illustration of a method 300 for providing an answer 106 from an entity from one of a plurality of entity groups 150*a-n* to a question 105. The method 300 may be implemented by the entity group interface 130.

A question is received at 301. The question 105 may be received by the entity group interface 130 from a client device 110. The question may be a multiple choice or a true or false question, for example. Other types of questions 105 may be supported.

Identifiers of a plurality of entity groups are received at 303. The identifiers may be received by the entity group interface 130. Each entity group may include a plurality of entities. The entities may include human experts or computer devices, for example. Each entity may have an associated cost that may represent the cost (in time, computational resources, money, etc.) of asking the entity a question. Each entity in an entity group may have the same associated cost in an implementation.

The exploration phase begins at 305. During the exploration phase, a subset of the entity groups whose entities provide an answer 106 to the retrieved question with a confidence that is above a first confidence threshold is determined. The subset may be determined by the test engine 210 of the entity group interface 130. The confidence may be determined based on the answer 106 and one or more previously received answers 106. The exploration phase may be a loop where a different entity group 150a-n is considered at each iteration. The exploration phase may continue until a condition is met such as an expiration of a duration of time or the exhaustion of a budget. After the exploration phase ends the method 300 may continue at 307.

In some implementations, the subset may be determined in the exploration phase by, for each entity group of the plurality of entity groups 150a-n, selecting an entity from the entity group, and providing the selected entity the received question 105. The test engine 210 may determine a confidence for a received answer based on the received answer 106 and a plurality of previously received answers 106. If the determined confidence is greater than the first confidence threshold 240, then the entity group is added to the determined subset by the entity group interface 130. If not, the entity group interface 130 may select a next entity group from the plurality of entity groups 150a-n for consideration in a subsequent iteration of the exploration phase.

The exploitation phase begins at 307. During the exploitation phase, whether there is an entity group from the subset of entity groups whose entity provides an answer with a confidence that is above a second confidence threshold is determined. The determination may be made by the test engine 210 of the entity group interface 130. The second confidence threshold 250 may be greater than the first confidence threshold 240 used in the exploration phase. The exploitation phase may be a loop where a different entity group 150a-n from the subset of entity groups is considered at each iteration of the phase. The exploitation phase may continue until either an entity group whose entity provides an answer 106 with a confidence that is greater than the second threshold 250 is determined, or a condition is met such as the expiration of an amount of time.

If an entity group from the subset of entity groups whose entity provides an answer 106 with a confidence that is above the second confidence threshold 250 is determined before the condition is met, then the method 300 may continue at 309. If the condition is met before determining an answer 106 with a confidence that is above the second confidence threshold 250, the method 300 may continue at 311.

The answer is provided at 309. The answer may be the answer 106 provided by the entity group with the confidence that is above the second confidence threshold 250 and determined during the exploitation phase. The answer 106 may be provided by the entity group interface 130 to the client device 110 that provided the question 105.

The rollback phase begins at 311. During the rollback phase, whether there is an entity group from the entire plurality of entity groups whose entity provides an answer with a confidence that is above the second confidence threshold is determined. The determination may be made by the test engine 210 of the entity group interface 130. The rollback phase may be a loop where the entity group interface 130 may iteratively consider each entity group of the entity groups 150a-n, rather than just the entity groups that were placed in the subset during the exploration phase. If an entity group from the entity groups 150a-n whose entity provides an answer 106 with a confidence that is above the second confidence threshold 250 is determined, then the method 300 may exit the rollback phase and continue at 313. Otherwise, the method 300 may remain in the rollback phase until a condition is met such as the expiration of an amount of time or the exhaustion of a budget. If the condition is met before an answer 106 with a confidence that is above the second confidence threshold 250 is determined, the method 300 may continue at 315.

The answer is provided at 313. The answer may be the answer with a confidence that is above the second confidence threshold 250. The answer may be provided by the entity group interface 130 to the client device 110 that provided the question 105.

An answer with the greatest determined confidence is provided at 315. The answer 106 may be provided by the entity group interface 130 to the client device 110 that provided the question 105. Because no answer was determined with a confidence that was greater than the second confidence threshold 250, the entity group interface 130 may provide the answer that had the highest determined confidence. The answer with the highest confidence may have been determined in any of the exploration, exploitation, or rollback phases. Alternatively or additionally, the entity group interface 130 may generate an error and provide the generated error to the client device 110. The error may indicate to the client device 110 that no answer 106 with a confidence that exceeded the second confidence threshold 250 could be determined.

Figure 4:
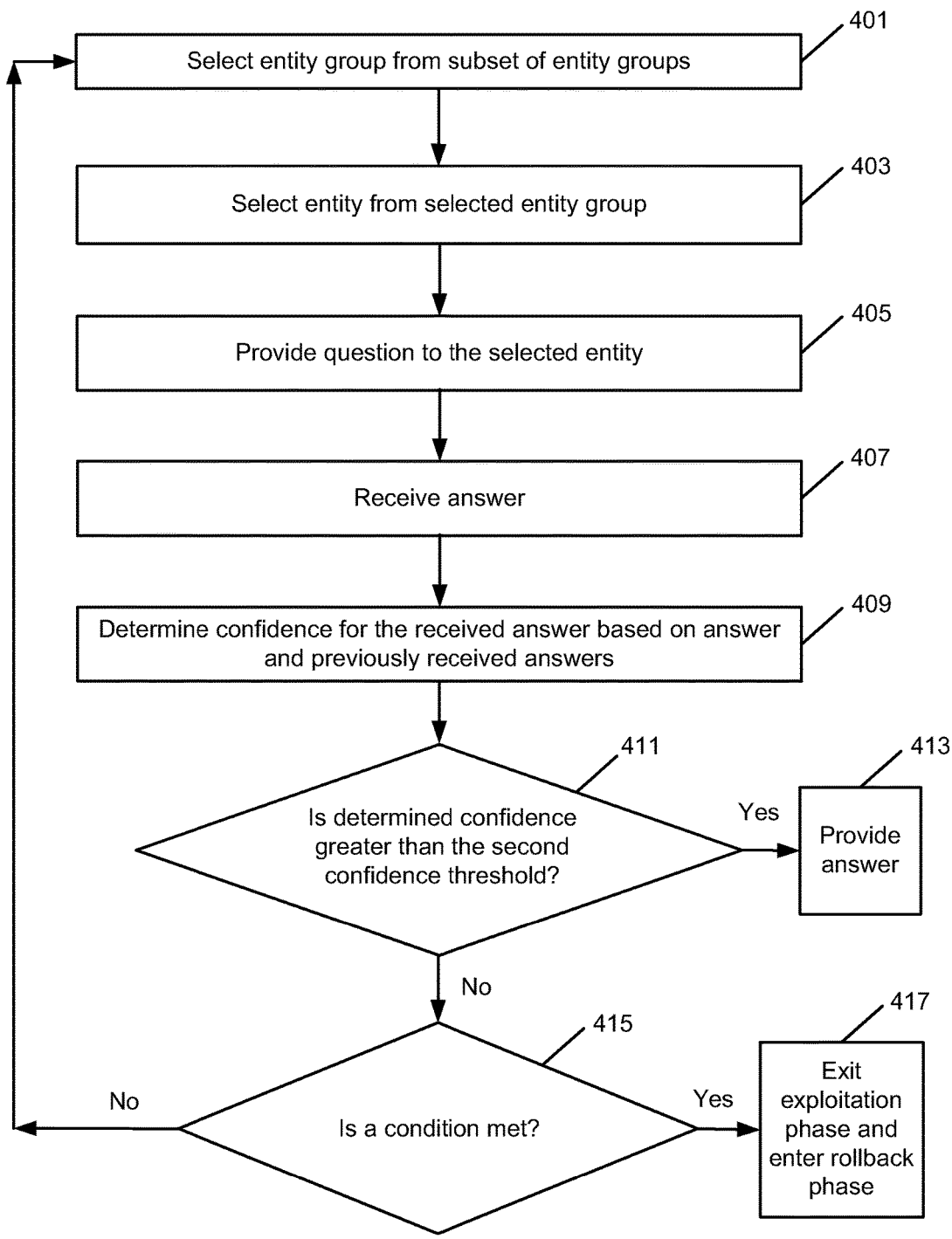
FIG. 4 is an illustration of a method for determining an answer with a confidence value that is greater than a second confidence threshold.

FIG. 4 is an illustration of a method 400 for determining an answer 106 with a confidence value that is greater than a second confidence threshold 250. The method 400 may be implemented by the entity group interface 130 and may be an example implementation of the exploitation phase described above.

An entity group is selected from a subset of entity groups at 401. The entity group may be selected from the subset of entity groups by the entity group selector 220 of the entity group interface 130. The subset of entity groups may have been determined by the entity group interface 130 during the exploration phase.

In some implementations, the entity group may be randomly selected from the subset, or may be selected based on a cost associated with entity groups in the subset. Alternatively, the entity group may be selected based on an index value associated with each of the entity groups 150a-n. For example, the entity group with the lowest index value may be selected.

An entity is selected from the selected entity group at 403. The entity may be selected by the entity group interface 130. In some implementations, the selected entity may be the first available entity from the selected entity group.

The selected entity is provided the question at 405. The selected entity may be provided the question 105 by the entity group interface 130. An answer to the question is received at 407. The answer 106 to the question 105 may be received by the entity group interface 130 from the selected entity.

A confidence of the received answer is determined at 409. The confidence of the received answer 106 may be determined by the test engine 210 of the entity group interface 130 based on the received answer and a plurality of previously received answers to the question 105 from entities of the selected entity group. The plurality of previously received answers may be stored by the entity group interface 130 in the answer data 230.

Whether the determined confidence is greater than the second confidence threshold is determined at 411. The determination may be made by the test engine 210 of the entity group interface 130. If the confidence is greater than the second confidence threshold 250, then the method 400 may exit the exploitation phase and continue at 413. Otherwise, the method 400 may continue at 415.

The answer is provided at 413. The answer 106 may be provided by the entity group interface 130 to the client device 110 that provided the question 105.

Whether a condition is met is determined at 415. Whether the condition is met is determined by the entity group interface 130. The condition may be a condition to exit the exploitation phase and enter the rollback phase, for example. The condition may comprise a time period expiring or a budget being exhausted, for example. If the condition is met, then the method 400 may exit the exploitation phase and enter the rollback phase at 417. Otherwise, the method 400 may remain in the exploitation phase and may return to 401 where a new entity group of the subset of entity groups 150*a-n* may be selected.

Figure 5:
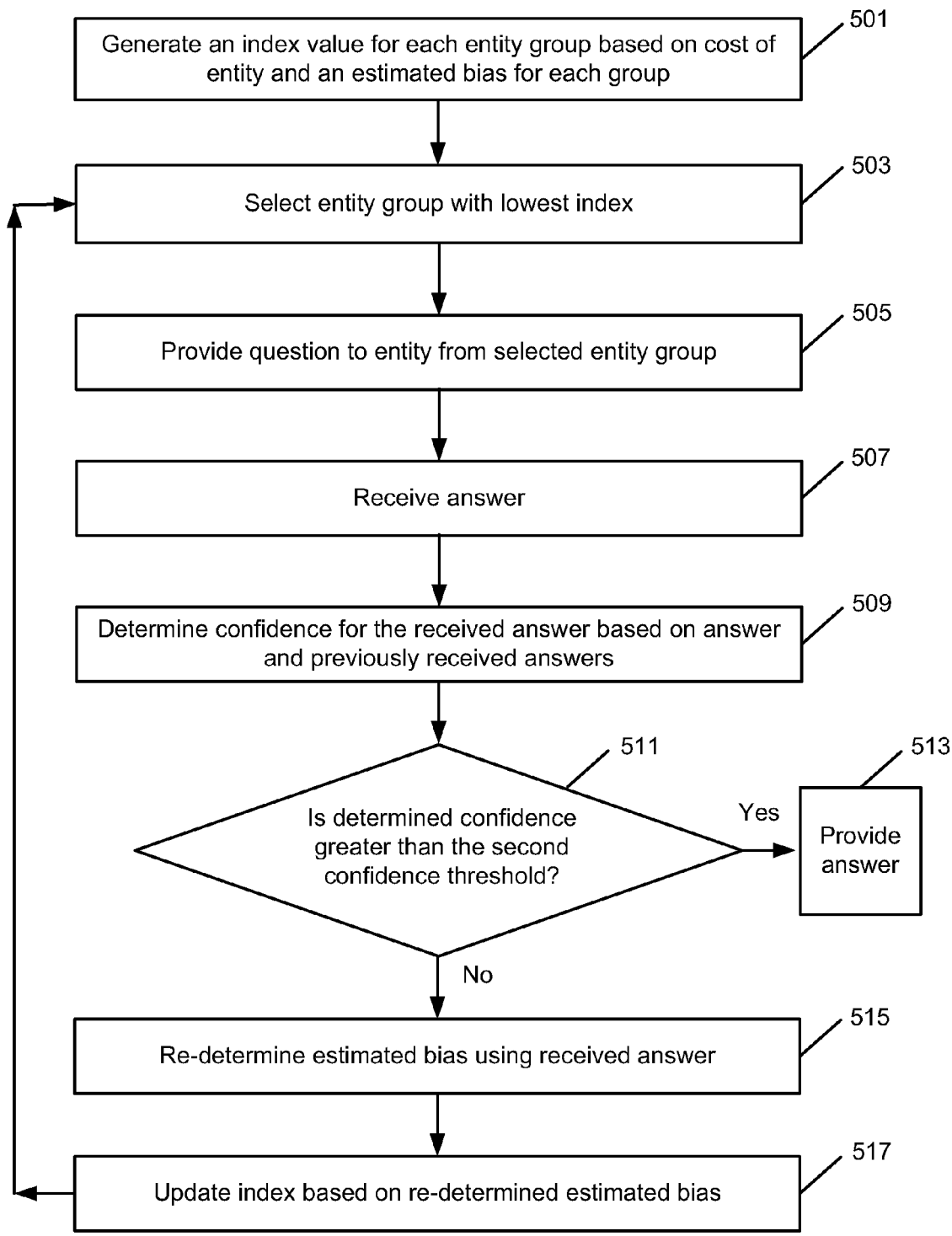
FIG. 5 is an illustration of a method for determining an answer with a confidence value that is greater than a second confidence threshold using index values.

FIG. 5 is an illustration of a method 500 for determining an answer 106 with a confidence value that is greater than a second confidence threshold 250 using index values. The method 500 may be implemented by the entity group interface 130.

An index value is generated for each of a plurality of entity groups at 501. The index values may be generated by the entity group selector 220 of the entity group interface 130. In some implementations, each index value may be generated based on a cost associated with the entity group and an estimated bias associated with each entity group. Because the bias for each entity group may not be known before answers are received, the bias for each entity group may initially be estimated.

An entity group with the lowest index value is selected at 503. The entity group may be selected by the entity group selector 220 of the entity group interface 130. An entity from the selected entity group is provided the question at 505. The entity may be provided the question 105 by the entity group interface 130. An answer to the question is received at 507. The answer 106 to the question 105 may be received by the entity group interface 130 from the entity from the selected entity group.

A confidence of the received answer is determined at 509. The confidence of the received answer may be determined by the test engine 210 of the entity group interface 130 based on the received answer and previously received answers from entities of the selected entity group. The previously received answers may be stored by the entity group interface 130 in the answer data 230.

Whether the determined confidence is greater than the second confidence threshold is determined at 511. The determination may be made by the test engine 210 of the entity group interface 130. If the confidence is greater than the second confidence threshold 250, then the method 500 may continue at 513. Otherwise, the method 500 may continue at 515.

The answer is provided at 513. The answer 106 may be provided by the entity group interface 130 to the client device 110 that provided the question 105.

The bias of the selected entity group is re-determined at 515. The bias may be re-determined by the entity group selector 220 of the entity group interface 130 based on the received answer 106, and any previously received answers 106 from entities of the selected entity group from the answer data 230.

The index is updated based on the re-determined bias at 517. The index may be updated by the entity group selector 220 of the entity group interface 130 by updating the index value of the selected entity group using the re-determined bias value. After updating the index, the method 500 may return to 503 where a new entity group may be selected according to the updated index.

Figure 6:
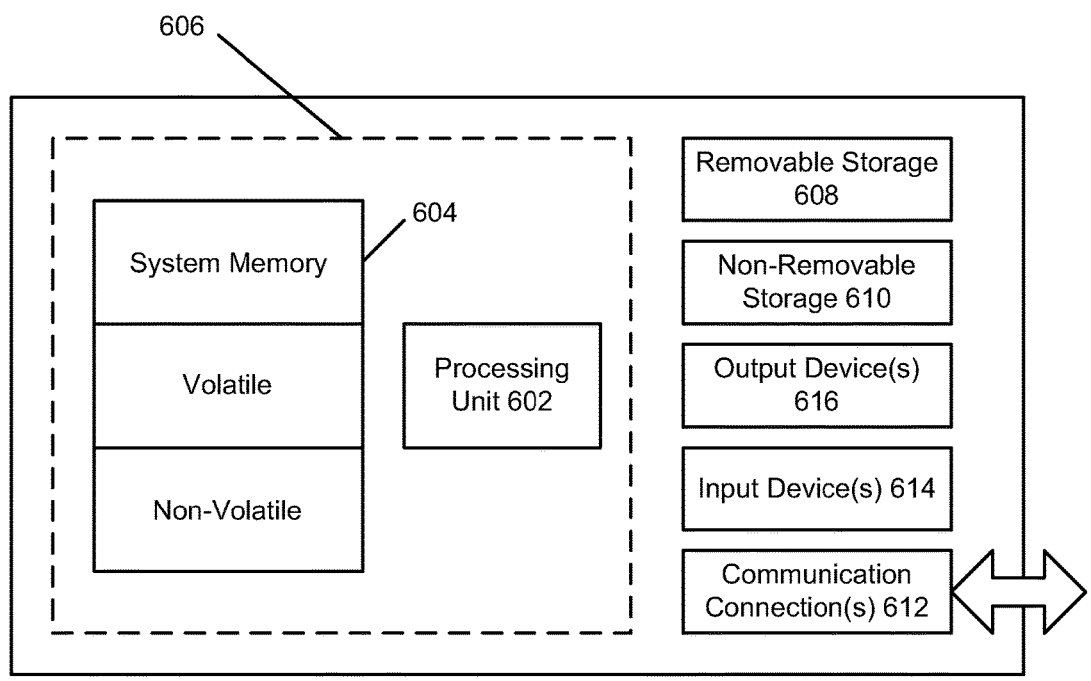
FIG. 6 shows an exemplary computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing system 600. In its most basic configuration, computing system 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing system 600 may have additional features/functionality. For example, computing system 600 may include additional storage (removable and/or non-removable) including, but not limited to, magnetic or optical disks or tape. Such additional storage is illustrated in FIG. 6 by removable storage 608 and non-removable storage 610.

Computing system 600 typically includes a variety of computer readable media. Computer readable media can be any available media that can be accessed by computing system 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such computer storage media may be part of computing system 600.

Computing system 600 may contain communications connection(s) 612 that allow the device to communicate with other devices. Computing system 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one computing device; and
   an entity group interface, implemented by the at least one computing device, that:
   receives a question through a network;
   receives identifiers of a plurality of entity groups through the network, wherein each entity group comprises one or more entities and each entity group is associated with a cost, wherein each cost comprises one or more of a networking bandwidth cost and a computer processing cost, wherein each entity comprises a computer program;
   estimates a bias for each entity group of the plurality of entity groups based on a difference between a first most frequently provided answer to the question from the entities of the entity group and a second most frequently provided answer to the question from the entities of the entity group;
   determines a subset of entity groups from the plurality of entity groups, wherein at least one entity in each entity group of the subset of entity groups provides an answer to the received question with a confidence value that is greater than a first confidence threshold;
   generates an index value for each entity group in the subset of entity groups based on the cost associated with each entity group in the subset of entity groups and the estimated bias associated with each entity group in the subset of entity groups;
   determines an entity group from the subset of entity groups based on the index values, wherein at least one entity in the entity group provides an answer to the received question with a confidence value that is greater than a second confidence threshold, wherein the second confidence threshold is greater than the first confidence threshold; and
   provides the answer with the confidence value that is greater than the second confidence threshold from the determined entity group from the subset of entity groups through the network.

2. The system of claim 1, wherein the question is a multiple choice question.

3. The system of claim 1, wherein the entity group interface that determines a subset of entity groups from the plurality of entity groups comprises the entity group interface that, for each entity group:
   selects an entity from the entity group;
   asks the selected entity the received question;
   receives an answer from the selected entity;
   determines the confidence value for the received answer based on the received answer and a plurality of previously received answers;
   determines if the determined confidence value is greater than the first confidence threshold; and
   if so, adds the entity group to the determined subset of entity groups.

4. The system of claim 3, wherein the entity group interface further, if the determined confidence value is not greater than the first confidence threshold:
   determines if a condition has been met;
   if the condition has not been met, selects a different entity from the entity group; and
   if the condition has been met, determines an entity group from the plurality of entity groups whose entities provide an answer to the received question with a confidence value that is greater than the second confidence threshold.

5. The system of claim 4, wherein the condition is exceeding a time.

6. The system of claim 1, wherein the entity group interface that determines an entity group from the subset of entity groups based on the index values further comprises the entity group interface that:
   selects an entity group from the subset of entity groups;
   selects an entity from the selected entity group;
   asks the selected entity the received question;
   receives an answer from the selected entity;
   determines the confidence value for the received answer based on the received answer and a plurality of previously received answers for the entity group;
   determines if the determined confidence value is greater than the second confidence threshold; and
   if so, provides the selected entity group as the determined entity group from the subset of entity groups.

7. The system of claim 6, wherein the entity group interface that selects an entity group from the subset of entity groups comprises the entity group interface that randomly selects an entity group from the subset of entity groups.

8. The system of claim 6, the entity group interface that selects an entity group from the subset of entity groups comprises the entity group interface that selects an entity group from the subset of entity groups with the lowest cost.

9. The system of claim 1, wherein the entity group interface that determines the entity group from the subset of entity groups based on the index values comprises the entity group interface that determines the entity group from the subset of entity groups with a lowest index value.

10. The system of claim 6, wherein the entity group interface further:
 if the determined confidence value is not greater than the second confidence threshold, continues to select entity groups from the subset of entity groups until either an entity group whose entities provide an answer to the received question that has a confidence value that is greater than the second confidence threshold is determined, or a condition is met.

11. The system of claim 10, wherein the condition is exceeding a time.

12. The system of claim 10, wherein if the condition is met the entity group interface further:
 determines an entity group from the plurality of entity groups whose entities provides an answer to the received question that has a confidence value that is greater than the second confidence threshold; and
 provides the answer from the determined entity group from the plurality of entity groups whose entities provides an answer to the received question that has a confidence value that is greater than the second confidence threshold.

13. A system comprising:
 at least one computing device; and
 an entity group interface, implemented by the at least one computing device, that:
 receives a question through a network;
 receives identifiers of a plurality of entity groups through the network, wherein each entity group comprises one or more entities and each entity group is associated with a cost, wherein each cost comprises one or more of a networking bandwidth cost and a computer processing cost, wherein each entity comprises a computer program;
 estimates a bias for each entity group of the plurality of entity groups based on a difference between a first most frequently provided answer to the question from the entities of the entity group and a second most frequently provided answer to the question from the entities of the entity group;
 determines a subset of entity groups from the plurality of entity groups, wherein at least one entity in each entity group of the subset of entity groups provides an answer to the received question with a confidence value that is greater than a first confidence threshold;
 generates an index value for each entity group in the determined subset of entity groups based on the cost associated with each entity group in the subset of entity groups and the estimated bias associated with each entity group in the subset of entity groups; and
 determines an entity group from the subset of entity groups based on the index values, wherein at least one entity in the entity group provides an answer to the received question with a confidence value that is greater than a second confidence threshold, wherein the second confidence threshold is greater than the first confidence threshold.

14. The system of claim 13, wherein the entity group interface further provides the answer with the confidence value that is greater than the second confidence threshold from the determined entity group from the subset of entity groups.

15. The system of claim 13, wherein the question is a multiple choice question.

16. The system of claim 13, wherein the entity group interface that determines a subset of entity groups from the plurality of entity groups further comprises the entity group interface that, for each entity group:
 selects an entity from the entity group;
 asks the selected entity the received question;
 receives an answer from the selected entity;
 determines the confidence value for the received answer based on the received answer and a plurality of previously received answers;
 determines if the confidence value is greater than the first confidence threshold; and
 if so, adds the entity group to the determined subset of entity groups.

17. The system of claim 16, wherein the entity group interface further, if the determined confidence value is not greater than the first confidence threshold:
 determines if a condition has been met;
 if the condition has not been met, selects a different entity from the entity group; and
 if the condition has been met, determines an entity group from the plurality of entity groups whose entities provide an answer to the received question, wherein each provided answer has a confidence value that is greater than the second confidence threshold.

18. The system of claim 17, wherein the condition is exceeding a time.

19. A system comprising:
 at least one computing device; and
 an entity group interface, implemented by the at least one computing device, that:
 receives identifiers of a plurality of entity groups through a network, wherein each entity group comprises one or more entities and each entity group is associated with a cost, wherein each cost comprises one or more of a networking bandwidth cost and a computer processing cost, wherein each entity comprises a computer program;
 estimates a bias for each entity group of the plurality of entity groups based on a difference between a first most frequently provided answer to a received question from the entities of the entity group and a second most frequently provided answer to the received question from the entities of the entity group;
 determines a subset of entity groups from the plurality of entity groups whose entity groups each have at least one entity that provides an answer to the received question with a determined confidence value that is greater than a first confidence threshold by, for each entity group of the plurality of entity groups:
 selecting an entity from the entity group;
 asking the selected entity the received question;
 receiving an answer from the selected entity;
 determining the confidence value for the received answer based on the received answer and a plurality of previously received answers;

determining if the determined confidence value is greater than the first confidence threshold; and if so, adding the entity group to the determined subset of entity groups;

generates an index value for each entity group in the subset of entity groups based on the cost associated with each entity group in the subset of entity groups and the estimated bias associated with each entity group in the subset of entity groups;

determines an entity group from the subset of entity groups based on the index values, wherein at least one entity in the entity group provides an answer to the received question with a determined confidence value that is greater than a second confidence threshold, and further wherein the second confidence threshold is greater than the first confidence threshold; and provides the answer with the determined confidence value that is greater than the second confidence threshold from the determined entity group from the subset of entity groups through the network.

20. A system comprising:

at least one computing device; and an entity group interface, implemented by the at least one computing device, that:

receives a question through a network;

receives identifiers of a plurality of entity groups through the network, wherein each entity group comprises one or more entities and each entity is associated with one or more answers for the question, each entity group is associated with a cost, each cost comprises one or more of a networking bandwidth cost and a computer processing cost, and each entity comprises a computer program;

estimates a bias for each entity group of the plurality of entity groups;

determines a subset of entity groups from the plurality of entity groups, wherein at least one entity in each entity group of the subset of entity groups provides an answer to the received question with a confidence value that is greater than a first confidence threshold;

generates an index value for each entity group in the subset of entity groups based on the cost associated with each entity group in the subset of entity groups and the estimated bias associated with each entity group in the subset of entity groups;

determines an entity group from the subset of entity groups based on a second threshold and the index values, wherein at least one entity in the entity group provides an answer to the received question with a confidence value that is greater than a second confidence threshold, wherein the second confidence threshold is greater than the first confidence threshold; and provides the one or more answers associated with the one or more entitles of the determined entity group from the subset of entity groups through the network.

* * * * *